US010908971B1

(12) United States Patent
Gonzalez et al.

(10) Patent No.: US 10,908,971 B1
(45) Date of Patent: Feb. 2, 2021

(54) METHOD AND SYSTEM FOR GENERATING A CUSTOMIZABLE CONNECTOR

(71) Applicant: salesforce.com, inc., San Francisco, CA (US)

(72) Inventors: Mariano Luis Gonzalez, Ciudad Autonoma de Buenos Aires (AR); Lucas Adriel Giordano, Buenos Aires (AR); Pablo Matias Angelani, Buenos Aires (AR); Pablo Damian La Greca, Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/777,568

(22) Filed: Jan. 30, 2020

(51) Int. Cl.
*G06F 9/54* (2006.01)
*G06F 8/41* (2018.01)

(52) U.S. Cl.
CPC ............... *G06F 9/541* (2013.01); *G06F 8/41* (2013.01)

(58) Field of Classification Search
None
See application file for complete search history.

(56) References Cited

U.S. PATENT DOCUMENTS

| 2005/0223392 | A1* | 10/2005 | Cox | G06Q 10/06 719/328 |
| 2008/0263470 | A1* | 10/2008 | Murman | G06Q 10/06 715/772 |
| 2009/0132220 | A1* | 5/2009 | Chakraborty | H04L 67/28 703/13 |
| 2017/0316355 | A1* | 11/2017 | Shrestha | G06F 40/123 |
| 2019/0354354 | A1* | 11/2019 | Dubinskii | G06F 8/61 |

* cited by examiner

*Primary Examiner* — Shih-Wei Kraft
(74) *Attorney, Agent, or Firm* — Sterne, Kessler, Goldstein & Fox P.L.L.C.

(57) ABSTRACT

Provided herein are system, method, and/or computer program product embodiments, and/or combinations and subcombinations thereof for generating customizable connectors. An API specification may be used to generate a connector descriptor including metadata properties. The connector descriptor maybe customizable. The API specification and connector descriptor may be used to generate a connector configured to connect with the API described in the API specification. The source code of the connector may also be customizable. Furthermore, the source code of the connector may be upgraded based on updates to the API spec, while preserving any customizations.

12 Claims, 5 Drawing Sheets

300

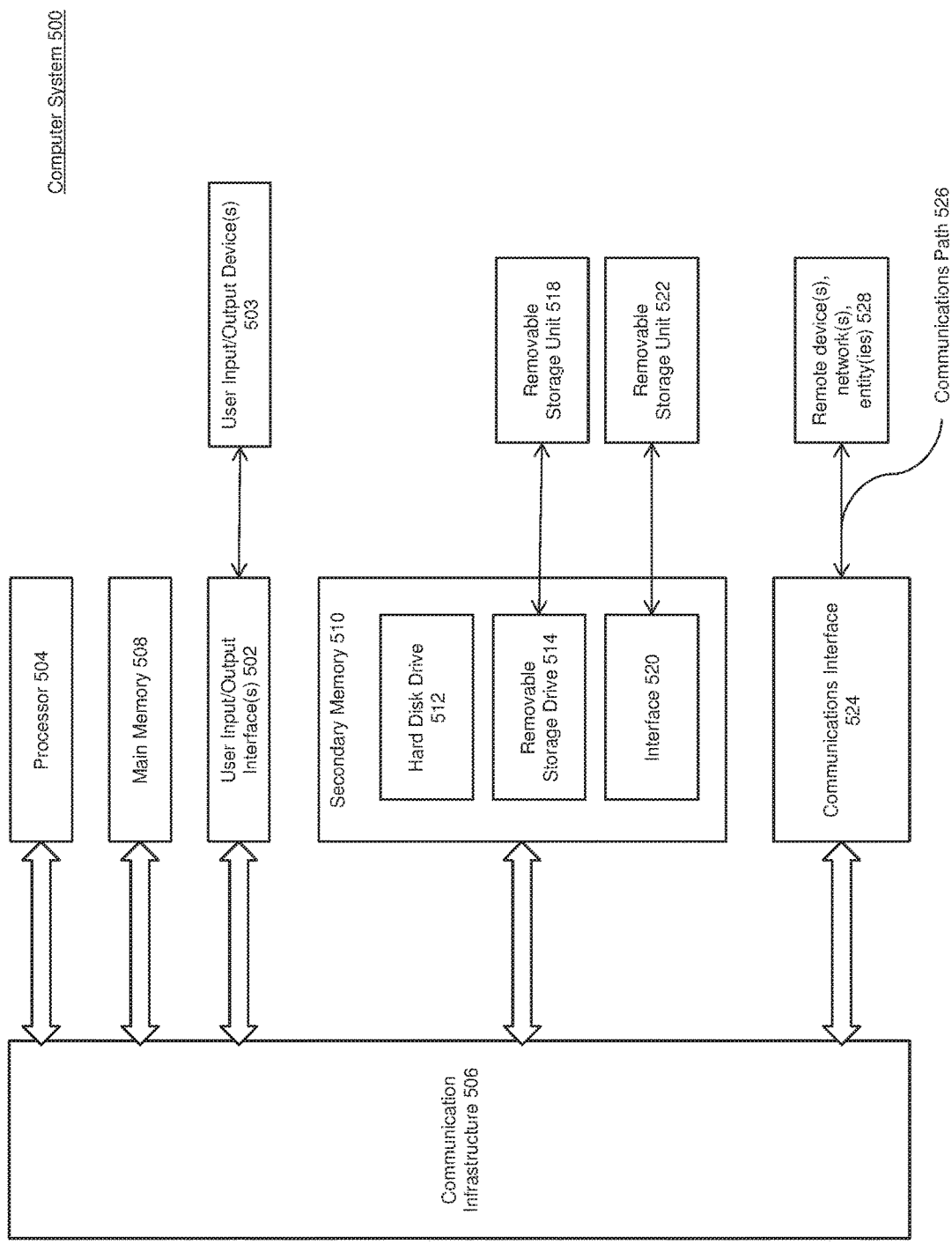

US 10,908,971 B1

METHOD AND SYSTEM FOR GENERATING A CUSTOMIZABLE CONNECTOR

BACKGROUND

Developers use Application Program Interface (API) specifications (specs) to generate APIs. The API spec includes a blueprint of the API. In particular, the API spec defines the behavior of the API and how the API links to other APIs. Developers may generate the APIs using languages such as RESTful API Modeling Language (RAML) or OpenAPI Specification (OAS). RAML is a language for the definition of HTTP-based APIs that embody principles of Representational State Transfer (REST). OAS defines a language-agnostic interface to RESTful APIs which allows both humans and computers to discover and understand the capabilities of the service.

Developers may generate connectors that connect applications to external APIs. Connectors may be used to transmit information, transmit and receive messages over a protocol to and from an API. The connector may also be used to process these messages. Developers may need to customize the connectors so that they can interface with APIs effectively. However, conventional systems have only provided limited capability for customizing connectors. This can cause the connectors to ineffectively communicate with the APIs.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIG. 5 is a block diagram of example components of a computing system according to an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for generating customizable connectors.

Application Program Interface (API) specs may be used to generate connectors that allow applications to interface with APIs on external systems (external APIs). For example, an API spec may describe a specification and the API spec may be used to generate a connector that connects to the API described in the API spec. The APIs themselves may provide different services. As an example, an API may provide HTTP based services (i.e., web services), SOAP based services, or REST based services. The SOAP based services such as NetSuite include a Web Service Definition Language (WSDL) file which describes its functionalities. The REST based services, languages such as RAML OAS, OData, and/or the like may be used to generate the API specs. Each of the types of services may have different descriptions in the specification with varying functionality. The connectors need to be able to connect to the different types of services.

The system described herein generates customizable connectors. In particular, an application may generate a connector descriptor using an API spec. Such application, for the purposes of this disclosure, is termed a "connect engine". The connector descriptor may enrich the API spec by allowing customization of metadata properties in the connector descriptor such as an authentication mechanism, stereotyping the paging endpoints, adding additional descriptions and documentation, enriching or overriding the types descriptions, or any other type of extra functionality relevant to the connector to be generated. The connect engine may use the connector descriptor and the API spec to generate a connector configured to connect with the API described in the API spec and also including the customizations of the connector descriptor. The connect engine may further provide source code for the connector which is also customizable/modifiable to further customize the connector.

This configuration allows a user to customize a connector at the connector descriptor stage and in the source code stage. Furthermore, this configuration allows for maintaining the customized source code even while the API specs and respective connector source code is upgraded.

In the event, the API spec is upgraded or a new version of the API spec is generated, the connect engine may generate source code of a connector using the previous API spec and generate source code of a new connector using the new version of the API spec, as described above. The connect engine may compare and merge the source code of the connector and the new connector, such that the customized/modified portions of the source code and any newly generated source code remain in the merged source code.

Figure 1:
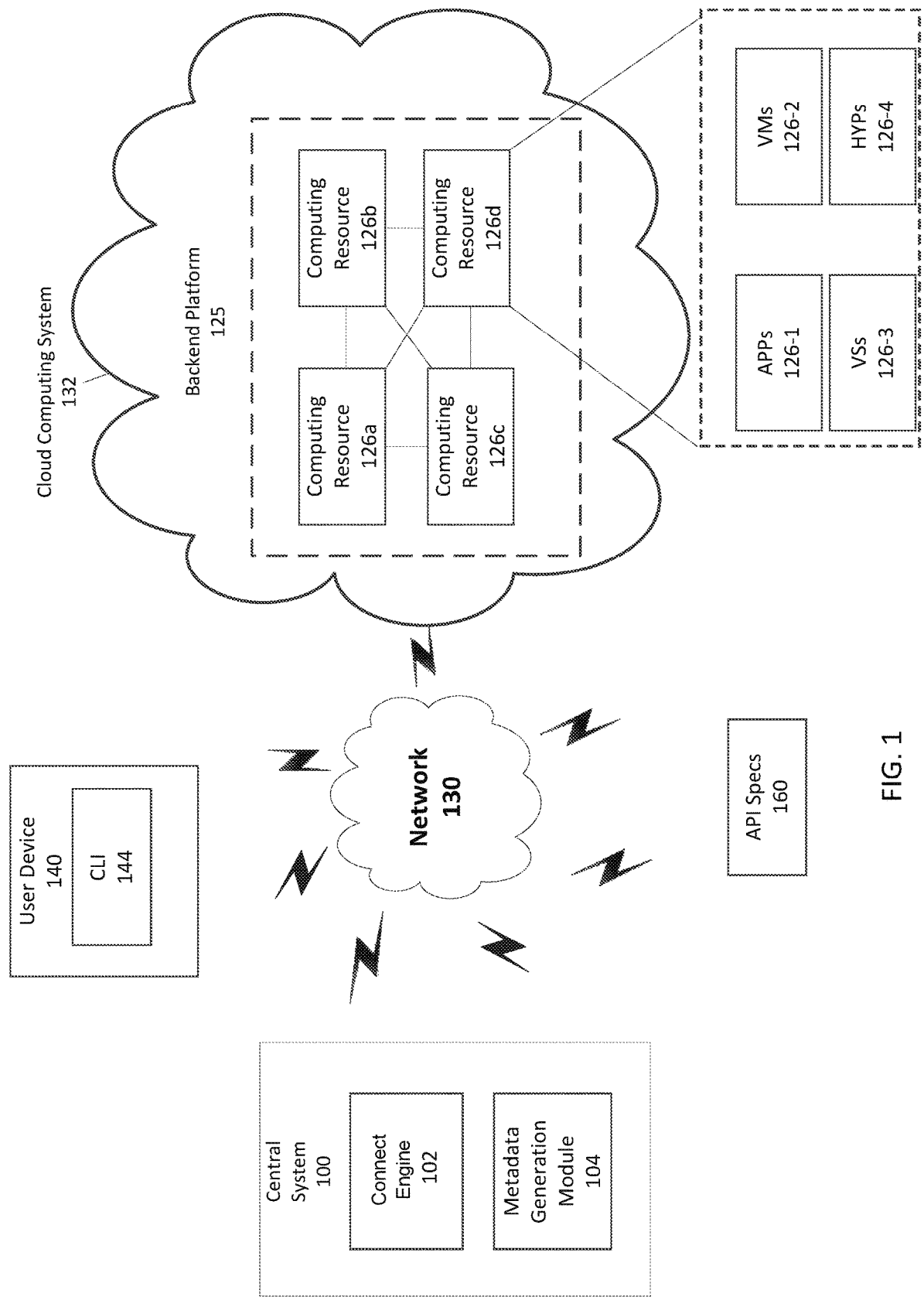
FIG. 1 is a block diagram of an example environment in which systems and/or methods described herein may be implemented according to an example embodiment.

FIG. 1 is a block diagram of an example environment in which systems and/or methods described herein may be implemented. The environment may include a central system 100, a user device 140, API specs repository 160, a cloud computing environment 132, and a network 130. The devices of the environment may be connected through wired connections, wireless connections, or a combination of wired and wireless connections.

In an example embodiment, one or more portions of the network 130 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 125 may include one or more devices configured to host the command line interface (CLI) 144. The backend platform 125 may include a server or a group of servers. In an embodiment, the backend platform 125 may be hosted in a cloud computing environment 132. It may be appreciated that the backend platform 125 may not be cloud-based, or may be partially cloud-based.

The central system 100 and the API specs repository 160 may include one or more devices configured to interface with the backend platform 125. In an embodiment, the user device 140 may execute CLI 144. The CLI 144 may interface with connect engine 102 and metadata generation module 104 located in the central system 100 to generate customizable connectors. The connect engine 102 and metadata generation module 104 may interface with API specs repository 160 to retrieve API specs. The central system 100 and API specs repository 160 may reside fully or partially in the cloud computing system 132. Alternatively, central system 100 and API specs repository 160 reside outside the cloud computing system 132.

The cloud computing environment 132 includes an environment that delivers computing as a service, whereby shared resources, services, etc. may be provided to the user device 140 and/or the backend platform 125. The cloud computing environment 132 may provide computation, software, data access, storage, and/or other services that do not require end-user knowledge of a physical location and configuration of a system and/or a device that delivers the services. The cloud computing system 132 may include computing resources 126*a-d*.

Each computing resource 126*a-d* includes one or more personal computers, workstations, computers, server devices, or other types of computation and/or communication devices. The computing resource(s) 126*a-d* may host the backend platform 125. The cloud resources may include compute instances executing in the computing resources 126*a-d*. The computing resources 126*a-d* may communicate with other computing resources 126*a-d* via wired connections, wireless connections, or a combination of wired or wireless connections.

Computing resources 126*a-d* may include a group of cloud resources, such as one or more applications ("APPs") 126-1, one or more virtual machines ("VMs") 126-2, virtualized storage ("VS") 126-3, and one or more hypervisors ("HYPs") 126-4.

Application 126-1 may include one or more software applications that may be provided to or accessed by user device 140. In an embodiment, the CLI 144 may be executed locally on the user device 140. Alternatively, the application 126-1 may eliminate a need to install and execute software applications on the user device 140. The application 126-1 may include software associated with backend platform 125 and/or any other software configured to be provided across the cloud computing environment 132. The application 126-1 may send/receive information from one or more other applications 126-1, via the virtual machine 126-2.

Virtual machine 126-2 may include a software implementation of a machine (e.g., a computer) that executes programs like a physical machine. Virtual machine 126-2 may be either a system virtual machine or a process virtual machine, depending upon the use and degree of correspondence to any real machine by virtual machine 126-2. A system virtual machine may provide a complete system platform that supports the execution of a complete operating system (OS). A process virtual machine may execute a single program and may support a single process. The virtual machine 126-2 may execute on behalf of a user and/or on behalf of one or more other backend platforms 125 and may manage the infrastructure of a cloud computing environment 132, such as data management, synchronization, or long-duration data transfers.

Virtualized storage 126-3 may include one or more storage systems and/or one or more devices that use virtualization techniques within the storage systems or devices of computing resource 126*a-d*. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations.

Hypervisor 126-4 may provide hardware virtualization techniques that allow multiple operations systems (e.g., "guest operating systems") to execute concurrently on a host computer, such as computing resource 126*a-d*. Hypervisor 126-4 may present a virtual operating platform to the guest operating systems and may manage the execution of the guest operating systems multiple instances of a variety of operating systems and may share virtualized hardware resources.

In an embodiment, the CLI 144 may receive input to generate a connector using an API spec to connect with the API described in the API spec. The API spec may be used to generate an API. The API spec indicates how an API functions and links with other APIs. An API spec includes a plan of how an API should look structurally. As an example, the API spec may be written in RAML or OAS. The CLI 144 may transmit a request to the metadata generation module 104. The request may include a reference to the specific API spec to generate the connector. In an embodiment, the reference may be a URL link to the API spec. Alternatively, the reference may be an identifier of the API spec. The connect engine 102 may retrieve the API spec from the API specs repository 160 using the reference. The connect engine 102 may parse and validate the API spec.

The connect engine 102 may scaffold a connector descriptor using the API spec. The connect engine 102 may generate metadata properties from the API spec and assign default values to the metadata properties. The connector descriptor includes the metadata properties. As an example the following metadata properties may be scaffolded from the API spec:

API Link
Generated artifact identifier
Operation Paths and Methods
Operation Names
Operation Descriptions
Parameter Names
Ignored Endpoints (defaulted to false)

A user may use the CLI 144 to modify the default values of the metadata properties in the connector descriptor. A user may also specify functionality relevant to the connector in the connector descriptor, such as custom authentication mechanism, stereotyping the paging endpoints, adding additional descriptions and documentation, enriching or overriding the types descriptions, or any other type of extra functionality relevant to the connector. The connect engine 102 may generate the connector based on the connector descriptor and the API spec. The connector may be able to connect with the API described in the API spec while including the customizations/modifications made to the connector descriptor. The connect engine 102 may provide the connector and source code of the connector to the user device 140. The user may use the CLI 144 to modify the source code of the connector. The connect engine 102 may flag (or tag) each modification made by the user in the source code.

In an embodiment, the connector may have been generated using the API spec of a first version. The API spec may have been updated at a later date resulting in an API spec of a second version. The connect engine 102 may generate a connector descriptor using the API spec of the second version and generate a new connector using the connector descriptor and the API spec of the second version. The connect engine 102 may compare the source code of the connector generated using the API spec of the first version and the connector generated using the API spec of the second version. The connect engine 102 may merge the source code of the connector generated using the API spec of the first version and the connector generated using the API spec of the second version.

In an embodiment, the connect engine 102 may identify the differences between the source code of the connector generated using the API spec of the first version and the connector generated using the API spec of the second version. The connect engine 102 may reconcile the differences between the source code of the connector and the new connector by identifying which is the accurate version of the source code. For example, the connect engine 102 may preserve the modifications made by the user to the source code of the connector. In this regard, the connect engine 102 may determine that unless the source code is flagged for being modified by the user, the source code of the new connector is the accurate version of the source code. Additionally, the connect engine 102 may determine that the source code, when modified by the user, is the accurate version of the source code. The connect engine 102 may merge the accurate versions of the source to generate merged source code for the connector. This way, the connector is configured to connect with the API spec of the second version while preserving the modifications to the source code made by the user.

In an embodiment, the connect engine 102 may determine whether merging the source code of the connector and the new connector is generating any exceptions or conflicts. The connect engine 102 may transmit these conflicts or exceptions to the user device 140.

As a non-limiting example, the following commands may be used to generate the connector in the CLI 144. A "create-descriptor" command may be used to generate the connector descriptor. The "create-descriptor" needs a reference to API spec and output directory parameters to be defined. As an example, the command line to create the connector descriptor may include a reference to the API spec and indicate that the API spec is coded in RAML. The command may indicate the directory or file name where the connector descriptor will be output A "create-connector" command may be used to generate a connector. The "create-connector" needs the descriptor or connector descriptor created above, API spec, and the output parameters to be defined. As an example, the command line to generate the connector may include a reference to the API spec and may indicate the API spec file is coded in RAML. The command line may further indicate the API descriptor file (or connector descriptor created above) and may indicate that the API descriptor file is a YAML type. The command line may indicate a file path where the connector will be output.

The connect engine 102 may validate the connector descriptor (or connector descriptor) and the API Spec in order to check for consistency and good practices before generating the connector. Some of these validations may not allow the connector to be generated when failing and others may just be warnings or information for the developer.

When generating the connector, the connect engine 102 may generate connector source code that the user can package and deploy. The precompiled code may be reused as much as possible. When generating a connector, the connect engine 102 may generate one configuration with multiple connection providers from where the user may select one when using the connector.

The connector may include configuration objects. The configuration objects may include the following parameters: default query params, default headers, response timeout, and response timeout unit.

The connector may further support multiple connection providers. The connection providers may be derived from the API spec but optionally the connector descriptor can be used to declare additional connection providers not supported by the API spec. The connect engine 102 may support a RAML 1.0 security scheme and extend the API spec.

In an embodiment, one or more security schemes may be defined in the API spec to secure the connector. API specs like RAML support defining security schemes at a global level and by operation level. This means that some operations might be unprotected. In this case, connect engine 102 may generate one connection provider per security scheme, regardless of unprotected operations. Unprotected operations will be defined on the same unique config as the other ones.

The API spec may define a security scheme that is not supported. In the event, the unsupported scheme is the only one defined in the API spec, then the generation of the connector will fail. In the event there are other security schemes defined in the API spec which can be used instead, then the generation of the connector will continue ignoring unsupported scheme and may generate a warning. The warning message may be displayed at a log level. In an embodiment, the connector may be generated without a security scheme.

Multiple security schemes may be defined for an operation. The connect engine 102 may identify one or more supported security schemes for each operation and generate using the identified security schemes.

In the event, a security scheme is defined globally, but a subset of operations is specifically directed towards a separate security scheme, then that subset may need to reside in a separate configuration that contains the proper connection providers.

The connection timeout parameter may be a timeout for establishing connections to the remote service. The connection timeout unit parameter may be a time unit that qualifies the connection timeout parameter. The connection idle timeout parameter may be a timeout for how long a connection can remain idle before it is closed. The value of the attribute is only used when persistent connections are enabled. The connection idle timeout parameter may be a time unit that qualifies the connection idle timeout. The user persistent connections parameter may be a Boolean value for closing a connection after a first request is completed. The max connections parameter may be the maximum number of outbound connections that will be kept open at the same time. The stream response parameter may control whether or not responses should be streamed. The response buffer size parameter may be a buffer size. The proxy configuration parameter may be used for configuring the connection via a proxy. The protocol parameter may be used to configure the TLS connection. This parameter appears when the API has optional HTTPS capabilities. If a connector does not support HTTPS or always requires it, then this parameter is not necessary. The TLS configuration parameter is similar to the protocol parameter, it is available when the API supports HTTPS.

In an embodiment, a contract for a parameter group that includes all the parameters necessary for configuring transport layer security (TLS) may be defined. Connection providers which support it may need to add a parameter group as a field and then return the parameter group. An API may enforce the use of HTTPS or allow a selection of HTTP or HTTPS. In the event, the API allows a selection of HTTP or HTTPS.

In an embodiment, a proxy configuration may include the following parameters: a host parameter, port parameter, username, and password. The host parameter may be a host that contains the proxy. All connector requests will be re-directed through the host. The port parameter may be a port where the proxy requests will be sent. All connector requests will go through this port. The username parameter is a username to authenticate against the proxy. The password parameter is a password used to authenticate against a proxy.

In an embodiment, an API spec may support Uniform Resource Identifiers (URIs) for HTTP calls. For example, a base URI may be fixed and specified in the API spec. Alternatively, connectors or APIs may have a default base URI but support alternate URIs to support different environments. Connectors or APIs may also expose different resources and group them under different base URIs. Furthermore, connectors or APIs may not have a general base URI at all and each instance/tenant may have their own base URI.

For an API or connector having a default base URI but supporting alternate URIs a connector descriptor supporting different kinds of base URIs' configuration may include the following parameters: value, type, and mapping. The value parameter may be a base URI value for the outbound HTTP calls. If the base URI value is defined, then it overrides the value indicated in the API Spec. The value is used for fixed or parameter base URI types. The type parameter may be a base URI type. The type might define a fixed value or parameter type parameterized URI overriding the default specified in the API Spec, or multiple exposing different resources grouped under different base URIs. The mapping parameter may be a configuration to define multiple base URIs. The multiple base URIs may be exposed as resources and grouped under different URIs.

For an API or connector having a default base URI but supporting alternate URIs, mapping configuration may include the following parameters: name, value, and default. The name parameter may be a URI name for the mapping entry. The name parameter may be a unique URI entry name to define the base URI details. The value parameter may be a base URI value. The value parameter may be a base URL for all outbound HTTP calls. The default parameter may be default value used in multiple base URIs' configuration. The default may define a default value of one of the multiple base URI configurations.

In an embodiment, connectors may be of different types. For example, a type of connection may be a basic authentication connection provider. The basic authentication connection provider may be an authentication method that is configured to create a connection to the API by requiring a username and password when calling apps to make a request. The basic authentication connection provider may include the following properties: username and password. The username and the password may be required when calling apps when making a request.

As another example, the connection type may be digested authentication connection provider. The digest authentication connection provider may authenticate a user based on a username and password. The authentication may be performed by transmitting the password in an encrypted form which is more secure than the simple base 64-bit encoding used by the basic authentication connection provider. The digest authentication connection provider may include the following properties: username and password.

As another example, the connection type may be the JWT connection provider. The JWT connection provider may be responsible for authenticating the user using the JWT-JSON Web Token. JWT connection provider enables identity and security information to be shared across security domains. When a client wants to use previous authorization, the client posts an access token request that includes a JWT to OAuth token endpoint. The system authenticates the authorized app through a digital signature that is applied to the JWT. Use the OAuth 2.0 JWT bearer token flow to define the authentication process.

As another example, the connection type may be an OAuth2 connection provider. The OAuth 2.0 authorization framework enables a third-party application to obtain limited access to an HTTP service, on behalf of a resource owner by orchestrating an approval interaction between the resource owner and the HTTP service. Alternatively, the third-party application to obtain limited access to an HTTP service by allowing the third-party application to obtain access on its own behalf. An authorization grant is a credential representing the resource owner's authorization (to access its protected resources) used by the client to obtain an access token.

In an embodiment, connectors may use various operations. The following are parameters common in the operations: custom headers, custom query parameters, response timeout, and response timeout unit. The custom header may be a non-primary content parameter with custom headers that will be sent in the request. The custom query parameters may be a non-primary content parameter with custom query parameters that will be sent in the request.

In an embodiment, the connectors may include request parameters. For example, the API spec may define body and non-body parameters. A content parameter may be a body parameter. The content body parameter may be defined in the API spec. The API spec may define multiple media types for an operation. The connect engine 102 may select one of the media types and generate metadata for the media type.

Operations may also take non-body parameters in the form of headers, query or URI parameters. These will be added as parameters in the operation and the scaffolder will generate code to add them to the request. The scaffolder will also make them of the correct type and mark each of those as required/optional/default or set a default value according to the API spec. As an example, these parameters may be array parameters or URI parameters.

In an embodiment, the generated connector will support streaming of the API response.

The media type for the response may be selected similarly in a similar manner as selected for the body parameter. If a media type of the response is defined in the connector descriptor, that one will be used. If it is not defined, a default one will be selected. Connect engine 102 may check the obtained response for the HTTP header. If present, the associated value will be set as the length of the returned result object.

In an embodiment, API specs may generate data of a given type. The connector may specify a data media type for expression language so the connect engine 102 may parse the connector. An API spec may generate data of a static type or dynamic type. Static type may be used when the API resource produces the same known type. For example, GET person/{personId} will return a pre-defined person object in the same known format, which means that the person object may not be customizable and may not vary depending on the environment or active user. The person may be the person object the {personID} may be the person's ID. In this example, the API spec defines the type either through XSD or JSON schema.

In an embodiment, when the API spec is being parsed to generate the connector descriptor, the connect engine 102 may collect the statically defined types and extract them into external files that may be placed in the same output directory as the generated metadata type. The connect engine 102 may detect and merge duplicate types, which means that if two or more resources define the same type multiple times, the connect engine 102 will only extract that type once and will reuse the same definition. In the event, the type definitions include a unique ID, then the connect engine 102 will respect that ID. In the event the type definition does not include a unique ID the connect engine 102 may automatically generate one. The connector descriptor may list all the types mapped to their obtained unique ID. The user can use these mappings to change the type names.

In an embodiment, JSON schemas can handle type IDs. The connector may use expression language's type system to parse JSON schemas and convert them to a compliant type definition. The connect engine 102 may detect JSON schemas with the $id property and add a redundant ID with the same name in order to keep the given ID. As part of the validation of the input API spec, connect engine 102 must validate that if two types of the same ID are provided, those schemas actually represent the same type. In particular, the connect engine 102 validates that if two types have the same ID they are structurally identical.

In an embodiment, as the connect engine 102 parses the API spec and generates the IDs, the connect engine 102 may dump the schemas to disk generating files for which the name will be based on the ID. For example: for the type add-flight-type, the connect engine 102 will generate add-flight-type-schema.json or add-flight-type-schema.xsd depending on whether the type was JSON or XML, defined.

For schemas in which an ID had to be generated, they will be modified so that they reflect the generated ID. For example, anonymous JSON schemas will have an added "ID" property containing the generated type name.

The generated connector descriptor may include mappings to leverage the types. For each operation, the connector descriptor will indicate the ID of the schema to use. The connector descriptor will link the name of these files to their actual ids. For example:
types:
add-flight-type-schema.json:
name: add-flight-type As shown above, the type will be referred to by the fine name and the "name" property will be optionally used to edit the name. Changing that name will have two effects. Firstly, when the connector is generated, those schema files will be added to the connector as resources, but their names will be recalculated based on the updated name. Secondly, the schema contents will be automatically edited again, so that they reflect the new ID.

In an embodiment, each operation may set the media type of its output. For example, the API spec may define that the output will have a unique output mime type.

In an embodiment, the API spec may be embodied as multipart specifications. The connect engine 102 may detect all multipart bodies. All resources with a body of mime type will be treated as multipart. If a mime type is not specified, the connector descriptor must allow specifying the multipart mime type.

Each part of a multipart operation may define a separate operation parameter. The parameter may store the information used by a class or method. The parameter name may be defined following the same logic as any other parameters in the connect engine 102. File Parts may be defined as parameter groups. A group of parameters that share some kind of special relationship where it makes sense for them to belong to the same group may be also be defined.

In an embodiment, connect engine 102 may add the ability to specify pagination methodologies using the connector descriptor file. The following three pagination methodologies may be supported:
  Offset based paging: For APIs which do paging based on an offset query param which requests results starting from result number N.
  Marker-based paging: For APIs which do paging based on a marker query param which points to a position in the dataset to be returned.
  Page number: Similar to offset, it works by having a query param which represents the page number to get.

The connector descriptor may provide an expression language to evaluate the response in order to obtain the page data. The expression language returns the page. The connect engine 102 executes the page splitting. In order to perform the page splitting, the page media type and encoding must be known.

As an example, an operation may be generated using offset based paging. On each request, the paging provider automatically increases the offset by the amount of items obtained on the previous page. Assuming that each page contains 10 items, the offset query param will indicate 0, 10, 20, etc., until an empty page is returned. Paged operations provide functionality for consuming a data feed in pages. The operation may contain an initial offset parameter. That parameter will be optional and default to zero.

In another example, an operation may be generated with page number based paging. In page number based paging the query param represents a page number instead of an offset. In this regard, the values will be 0, 1, 2, etc., until an empty page is obtained. The page number based paging requires the name of the query param for the page number.

In another example, an operation may be generated using marker-based paging. In marker-based paging, the API does paging based on a marker value provided in the response of each request, acting as a marker or position inside the stream of results. For example, request number 1 will obtain the first page plus a marker embedded in the response. Said marker will be added as a query param in request number 2, which will reply with the next page and a new marker which overwrites the prior one. The process continues until no new marker is provided or the next page comes back empty. This marker-based paging requires the name of the query param in which the marker is to be passed and the expression language to extract it.

In an embodiment, a limit and paging parameter may be scaffolded. The limit parameter controls how many results are to be returned. In some APIs, the limit parameter puts a cap on the total number of items to be returned. Alternatively, the limit parameter refers to how many items to return per page. In any case, the value of such parameter does not change between invocations.

With respect to the paging parameter, paging operations may require the name of those parameters and they are in charge of putting them in the request. When generating the operation the scaffolder may not add those parameters into the method signature.

In an embodiment, a trigger may be embodied as a polling source. A polling source is a background task executed and managed by the connector. The polling source regularly polls a source system looking for new or updated information. The connect engine 102 will allow the user to configure custom actions to capture the information (i.e., new or updated information) provided by the trigger. For declaring a trigger, an operation must define a response type. If the operation does not define the trigger, it will be ignored and will not generate a trigger in the connector. A trigger will be configured to poll an endpoint for new values. Every time the endpoint returns a value that was not present previously that value will be propagated to the flow.

Watermarks are part of the trigger functionality. For a watermark, in order to trigger the event when there are new entities ready to be processed, a pointer to the latest entity that has processed is needed. For example, if you are polling for a list of blog posts and you need to notify subscribers when a new one is published, you will need to check for the post date. The connect engine 102 will provide watermark functionality. This means, if there is a watermark placeholder in the URL it will be replaced with the current watermark. The connector descriptor will allow a user to define from where to extract the watermark value from in the server response. When the server returns a new value it will be stored as the new watermark and that value will be used for further requests.

The following parameters are needed for watermark extraction: field and expression. The watermark extraction defines the next watermark for every response obtained from the endpoint. The watermark should be extracted from the field in the response and set as the next watermark. A custom expression may be defined in order to extract a value from the response. The connect engine 102 may provide the user an input for this expression that should be the same as the HTTP connector output would be if it made that request. This means the expression should have access to headers, properties, and payload in the same way. The watermark extraction may further include the following parameters: language and content. The language parameter may define the language used for the expression. This should be expression language by default. The content parameter may be the content of the expression such as an expression language script.

In order for the connector to be usable, the user may set an initial value for the watermark. This is to avoid querying all of the values in the first request. In an embodiment, the connect engine 102 may set extracted value from a field in the response as the responses ID.

Figure 2:
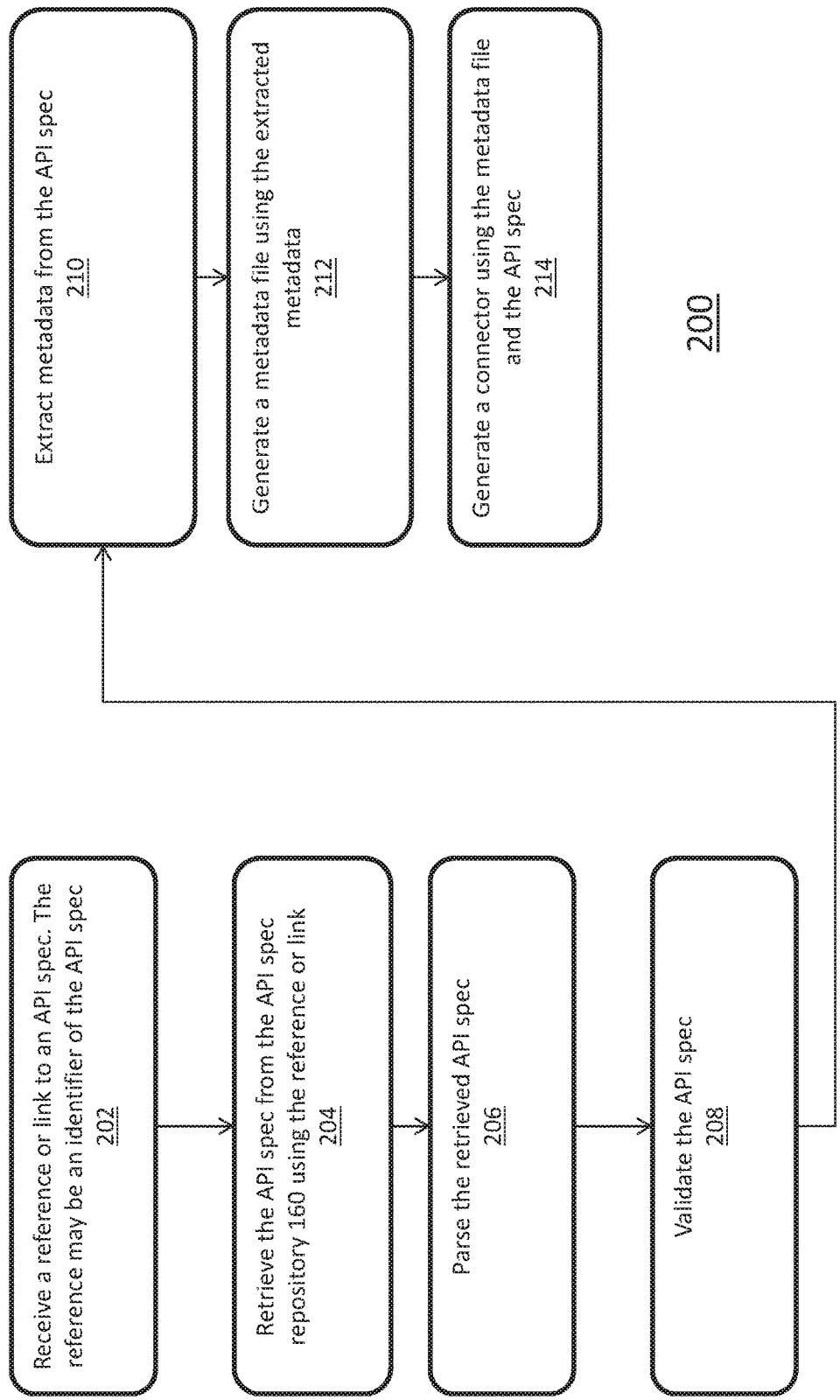
FIG. 2 is a flowchart illustrating a process of generating a connector according to an embodiment.

FIG. 2 is a flowchart illustrating a process 200 of generating a connector according to an embodiment. It is to be appreciated the operations may occur in a different order, and some operations may not be performed.

In operation 202, a metadata generation module may receive a reference or link to an API spec. The reference may be an identifier of the API spec. A command line interface (CLI) may receive input to generate a connector using an API spec to connect with the API described in the API spec. The API spec may define an API and may be used in generating the API. Connectors may be used to transmit information, transmit and receive messages over a protocol to and from an API. The connector may also be used to process these messages.

In operation 204, the metadata generation module may retrieve the API spec from the API spec repository using the reference or link.

In operation 206, a connect engine may parse the retrieved API spec. When the API spec is being parsed to generate the connector descriptor, the connect engine may collect the statically defined types and extract them into external files that may be placed in the same output directory as the generated metadata type In operation 208, the connect engine may validate the API spec. The connect engine may validate the connector descriptor (or connector descriptor) and the API Spec in order to check for consistency and good practices before generating the connector. Some of these validations may not allow the connector to be generated when failing and others may just be warnings or information for the developer.

In operation 210, the metadata generation module may extract metadata from the API spec.

In operation 212, the connect engine may generate a connector descriptor using the extracted metadata. The connector descriptor may be a connector descriptor file including scaffolded metadata properties based on the API spec.

In operation 214, the connect engine may generate a connector using the connector descriptor and the API spec. The connector may be configured to connect with the API described in the API spec.

Figure 3:
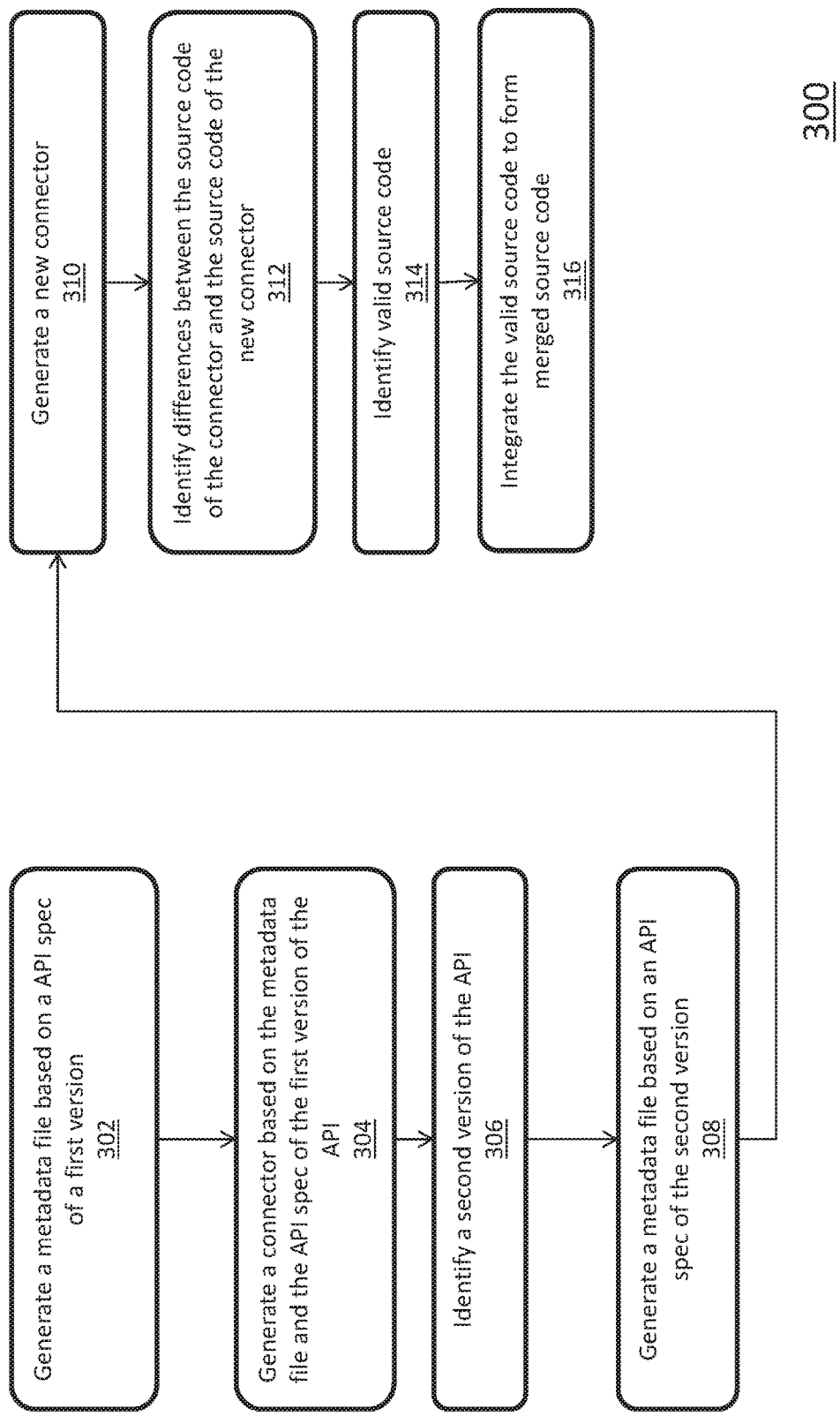
FIG. 3 is a flowchart illustrating a process of merging connector source code according to an embodiment.

FIG. 3 is a flowchart illustrating a process 300 of merging connector source code according to an embodiment. It is to be appreciated the operations may occur in a different order, and some operations may not be performed.

In operation 302, a connect engine may generate a connector descriptor based on an API spec of a first version of an API. A command line interface (CLI) may receive input to generate a connector using an API spec to connect with the API described in the API spec. The API spec may define an API and may be used in generating the API.

In operation 304, the connect engine may generate a connector based on the connector descriptor and the API spec of the first version of the API. The connector descriptor may be a connector descriptor file including scaffolded metadata properties based on the API spec.

In operation 306, the connect engine may identify a second version of the API. As an example, the API may be updated/upgraded at a later point in time.

In operation 308, the connect engine may generate a connector descriptor based on an API spec of the second version. As the API has been updated/upgraded the API spec o the API is also updated/upgraded.

In operation 310, the connect engine may generate a new connector using the connector descriptor generated using the API spec of the second version and the API spec of the second version. The new connector may be configured to connect with the API of the second version. However, a user may have customized the connector configured to connect with the API of the first version. The user may need to save their customizations when using the new connector to connect with the API of the second version.

In operation 312, the connect engine may identify differences between the source code of the connector and the source code of the new connector. For example, the connect engine may identify the customizations implemented in the source code of the connector.

In operation 314, the connect engine may identify valid source code between the source code of the connector and the source code of the new connector in portions of the differences between the source code of the connector and the source code of the new connector.

In operation 316, the connect engine may merge the source code of the connector and the source code of the new connector by the integrating the valid source code to form merged source code. The merged source code may preserve any customizations made to the source code by a user while updating the merged source code based on the new version of the API spec.

Figure 4:
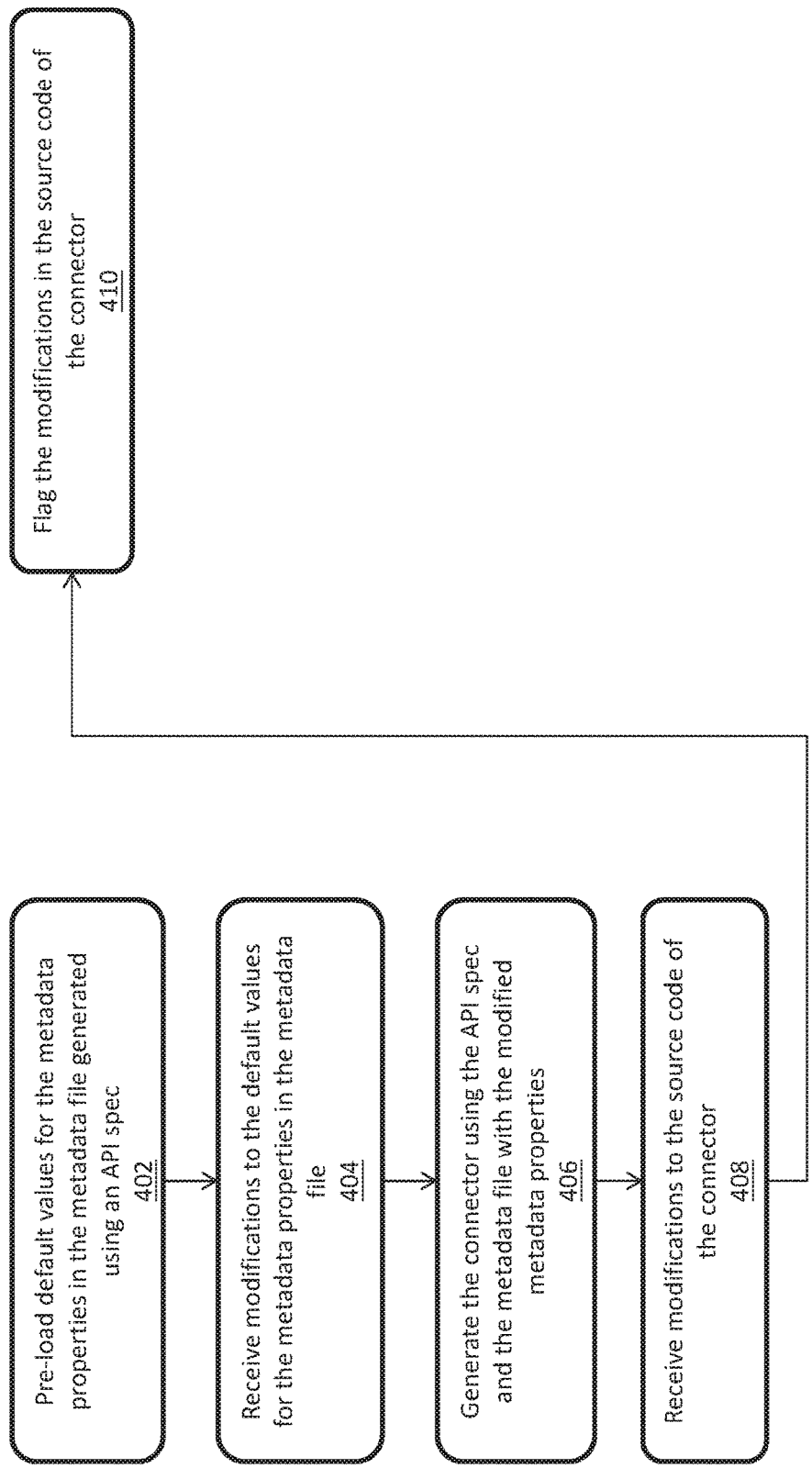
FIG. 4 is a flowchart illustrating a process of customizing the connector according to an embodiment.

FIG. 4 is a flowchart illustrating a process of customizing the connector according to an embodiment.

In operation 402, a connect engine may pre-load default values for the metadata properties in the connector descriptor generated using an API spec. For example, a command line interface (CLI) may receive input to generate a connector using an API spec to connect with the API described in the API spec. The API spec may define an API and may be used in generating the API. The API spec may be used to generate the connector descriptor. The connector descriptor may include default values for the metadata defined in the file.

In operation 404, the connect engine may receive modifications to the default values for the metadata properties in the connector descriptor. A user may customize the connector descriptor by modifying the default values of the metadata defined in the file.

In operation 406, the connect engine may generate the connector using the API spec and the connector descriptor with the modified metadata properties. The connector may be configured to connect with the API defined in the API spec.

In operation 408, the connect engine may receive modifications to the source code of the connector. A user may further customize the connector by modifying the source code of the connector.

In operation 410, the connect engine may flag the modifications in the source code of the connector. The customizations may be tracked so that when the connector is updated to connect with a new version of the API, the customizations may be carried over to the updated connector.

FIG. 5 is a block diagram of example components of device 500. One or more computer systems 500 may be used, for example, to implement any of the embodiments discussed herein, as well as combinations and sub-combinations thereof. Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 308, such as random access memory (RAM). Main memory 508 may include one or more levels of cache. Main memory 308 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514.

Removable storage drive 514 may interact with a removable storage unit 518. Removable storage unit 518 may include a computer-usable or readable storage device having stored thereon computer software (control logic) and/or data. Removable storage unit 518 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A computer-implemented method, comprising:
   receiving, by one or more computing devices, a request to generate a connector using a first Application Program Interface (API) specification of a first version of an API;
   receiving, by the one or more computing devices, a link to the first API specification of the first version of the API;
   parsing, by the one or more computing devices, the first API specification of the first version of the API;
   validating, by the one or more computing devices, the first API specification of the first version of the API by checking consistency of the first API specification;
   generating, by the one or more computing devices, metadata from the first API specification of the first version of the API;
   generating, by the one or more computing devices, a connector descriptor by scaffolding metadata properties from the generated metadata;
   generating, by the one or more computing devices, a connector based on the connector descriptor and the first API specification;
   identifying, by the one or more computing devices, a second version of the API;
   generating, by the one or more computing devices, a new connector descriptor based on a second API specification of the second version of the API;
   generating, by the one or more computing devices, a new connector based on the new connector descriptor and the second API specification;
   identifying, by the one or more computing devices, valid source code between a first source code of the connector and a second source code of the new connector in portions of differences between the first source code of the connector and the second source code of the new connector; and
   integrating, by the one or more computing devices, the valid source code to form merged source code.

2. The method of claim 1, further comprising, pre-loading, by the one or more computing devices, default values for the metadata properties in the connector descriptor.

3. The method of claim 2, further comprising receiving, by the one or more computing devices, modifications to the default values for the metadata properties in the connector descriptor, wherein the connector reflects the modifications to the default values for the metadata properties.

4. The method of claim 1, further comprising:
   receiving, by the one or more computing devices, modifications to the first source code of the connector; and
   flagging, by the one or more computing devices, the modifications in the first source code of the connector.

5. A system comprising:
   a memory;
   a processor coupled to a memory, the processor configured to:
      receive a request to generate a connector using a first Application Program Interface (API) specification of a first version of an API;
      receive a link to the first API specification of the first version of the API;
      parse the first API specification of the first version of the API;
      validate the first API specification of the first version of the API by checking consistency of the first API specification;
      generate metadata from the first API specification of the first version of the API;
      generate a connector descriptor by scaffolding metadata properties from the generated metadata;
      generate a connector based on the connector descriptor and the first API specification;
      identify a second version of the API;
      generate a new connector descriptor based on a second API specification of the second version of the API;
      generate a new connector based on the new connector descriptor and the second API specification;
      identify valid source code between a first source code of the connector and a second source code of the new connector in portions of differences between the first source code of the connector and the second source code of the new connector; and
      integrate the valid source code to form merged source code.

6. The system of claim 5, wherein the processor is further configured to pre-load default values for the metadata properties in the connector descriptor.

7. The system of claim 6, wherein the processor is further configured to receive modifications to the default values for the metadata properties in the connector descriptor, wherein the connector reflects the modifications to the default values for the metadata properties.

8. The system of claim 5, wherein the processor is further configured to:
receive modifications to the first source code of the connector; and
flag the modifications in the first source code of the connector.

9. A non-transitory computer-readable medium having instructions stored thereon that, upon execution by at least one computing device, cause the at least one computing device to perform operations comprising:
receiving a request to generate a connector using a first Application Program Interface (API) specification of a first version of an API;
receiving a link to the first API specification of the first version of the API;
parsing the first API specification of the first version of the API;
validate the first API specification of the first version of the API by checking consistency of the first API specification;
generating metadata from the first API specification of the first version of the API;
generating a connector descriptor by scaffolding metadata properties from the generated metadata;
generating a connector based on the connector descriptor and the first API specification;
identifying a second version of the API;
generating a new connector descriptor based on a second API specification of the second version of the API;
generating a new connector based on the new connector descriptor and the second API specification;
identifying valid source code between a first source code of the connector and a second source code of the new connector in portions of differences between the first source code of the connector and the second source code of the new connector; and
integrating the valid source code to form merged source code.

10. The non-transitory computer-readable medium of claim 9, the operations comprising: pre-loading default values for the metadata properties in the connector descriptor.

11. The non-transitory computer-readable medium of claim 10, the operations comprising: receiving modifications to the default values for the metadata properties in the connector descriptor, wherein the connector reflects the modifications to the default values for the metadata properties.

12. The non-transitory computer-readable medium of claim 9, the operations comprising:
receiving modifications to the first source code of the connector; and
flagging the modifications in the first source code of the connector.

* * * * *